United States Patent
Takahashi

(10) Patent No.: US 8,320,862 B2
(45) Date of Patent: Nov. 27, 2012

(54) RECEIVER AND RECEIVING SYSTEM

(75) Inventor: Kiyonori Takahashi, Sagamihara (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 372 days.

(21) Appl. No.: 12/699,722

(22) Filed: Feb. 3, 2010

(65) Prior Publication Data

US 2010/0195771 A1   Aug. 5, 2010

(30) Foreign Application Priority Data

Feb. 3, 2009   (JP) .................................. 2009-22748

(51) Int. Cl.
*H04B 1/16* (2006.01)
(52) U.S. Cl. ......... 455/205; 455/101; 455/130; 455/132
(58) Field of Classification Search .................... 455/205
See application file for complete search history.

(56) References Cited

U.S. PATENT DOCUMENTS

| 7,970,366 B2 * | 6/2011 | Arita et al. ..................... 455/130 |
| 2009/0187558 A1 | 7/2009 | McDonald |
| 2010/0069022 A1 * | 3/2010 | Bloebaum et al. ............ 455/101 |

FOREIGN PATENT DOCUMENTS

JP   06-169273   6/1994

OTHER PUBLICATIONS

Q. Sandifort et al., "IF-to-Digital Converter for FM/AM/IBOC Radio," IEEE, p. 707-710.
Office Action mailed Jul. 17, 2012 in Japanese Patent Application No. JP 2009-022748, filed Feb. 3, 2009.

* cited by examiner

*Primary Examiner* — Duc Nguyen
*Assistant Examiner* — Ajibola Akinyemi
(74) *Attorney, Agent, or Firm* — Knobbe, Martens, Olson & Bear, LLP

(57) ABSTRACT

When the first switching circuit outputs the output signal of the first selection filter, the receiver switches the output signal of the second switching circuit to the output signal of the delay compensator, and when the first switching circuit outputs the output signal of the second selection filter, the receiver switches the output signal of the second switching circuit to the output signal of the third selection filter.

20 Claims, 11 Drawing Sheets

| SELECTION FILTER | GROUP DELAY TIME |
| --- | --- |
| Type1 | W |
| Type2 | X |
| Type3 | Y |
| Type4 | Z |

FIG.11

| CONTROL SIGNAL DELAY | DELAY TIME |
| --- | --- |
| 0 | 0 |
| 1 | A |
| 2 | B |
| 3 | C |
| 4 | D |

FIG.12

RECEIVER AND RECEIVING SYSTEM

CROSS-REFERENCE TO RELATED APPLICATION

This application is based upon and claims the benefit of priority from the prior Japanese Patent Application No. 2009-22748, filed on Feb. 3, 2009, the entire contents of which are incorporated herein by reference.

BACKGROUND OF THE INVENTION

1. Field of the Invention

The present invention relates to a receiver and a receiving system that can receive analog radio broadcasting.

2. Background Art

FM signals used in analog radio broadcasting have a constant envelope. However, when FM signals propagate through multiple paths, the constant envelope of the FM signals may be lost because of the multipath effect.

The constant modulus algorithm (CMA) is an equalization algorithm based on the constant envelope of the FM signals. The CMA is expressed by the following update formula (1), where "x" represents an input signal, "y" represents an output signal, "w" represents a weight, "$\mu$" represents a step coefficient, and "$\sigma$" represents a target amplitude.

$$w(n+1) = w(n) - \mu x(n) y^*(y^2 - \sigma^2) \qquad (1)$$

In the above formula (1), the output signal "y" converges to the target amplitude "$\sigma$". Therefore, the CMA algorithm effectively reduces multipath to keep the output having a constant envelope.

For example, there is a conventional receiving system for in-band on-channel (IBOC) hybrid digital radio (HD-Radio). The receiving system uses a spatial equalizer using two antennas and two tuners, for example.

For a conventional spatial equalizer, when the tuners use filters having different pass bands, such as when one of the tuners uses a filter for IBOC, and the other uses a filter for FM, a difference in delay time can occur between the two tuners. The difference in delay time reduces the effect of multipath equalization by the spatial equalizer.

There is a conventional receiver that has delaying means that delays the signal received at one antenna with respect to the signal received at the other antenna (see Japanese Patent Laid-Open No. 6-169273, for example)

The conventional receiver described above is intended to reduce the possibility of destructive interference between signals input at two antennas.

However, the conventional receiver described above does not take into account the effect of the difference in delay time on the effect of multipath equalization by the spatial equalizer.

SUMMARY OF THE INVENTION

According to one aspect of the present invention, there is provided: a receiver comprising:

a first selection filter having a first pass band centered on a carrier that filters an input signal and outputs a filtered signal;

a second selection filter having a second pass band narrower than the first pass band centered on the carrier that filters an input signal and outputs a filtered signal;

a first switching circuit that switches between an output signal of the first selection filter and an output signal of the second selection filter for output;

a first tuner that frequency-converts a signal received at a first antenna into a first signal and outputs the first signal to the first selection filter and the second selection filter, and processes a signal input from the first switching circuit into a second signal and outputs the second signal;

a first analog-to-digital converter that converts the second signal from analog to digital and outputs the converted second signal;

a third selection filter having a third pass band narrower than the second pass band centered on the carrier that filters an output signal of the first analog-to-digital converter and outputs a filtered signal;

a delay compensator that outputs the output signal of the third selection filter delayed by a prescribed delay time;

a second switching circuit that switches between the output signal of the third selection filter and the signal output from the delay compensator for output;

a fourth selection filter having a same pass band as the second pass band that filters an input signal and outputs a filtered signal;

a second tuner that frequency-converts a signal received at a second antenna into a third signal and outputs the third signal to the fourth selection filter, and processes a signal input from the fourth selection filter into a fourth signal and outputs the fourth signal;

a second analog-to-digital converter that converts the fourth signal from analog to digital and outputs the converted fourth signal;

a fifth selection filter having a same pass band as the third pass band that filters an output signal of the second analog-to-digital converter and outputs a filtered signal; and a multipath equalizer that receives output signals of the second switching circuit and the fifth selection filter, performs multipath equalization and outputs an equalized signal.

According to another aspect of the present invention, there is provided: a receiver comprising:

a first selection filter having a first pass band centered on a carrier that filters an input signal and outputs a filtered signal;

a first tuner that frequency-converts a signal received at a first antenna into a first signal and outputs the first signal to the first selection filter, and processes a signal input from the first switching circuit into a second signal and outputs the second signal;

a first analog-to-digital converter that converts the second signal from analog to digital and outputs the converted second signal;

a second selection filter having a second pass band narrower than the first pass band centered on the carrier that filters an output signal of the first analog-to-digital converter and outputs a filtered signal;

a delay compensator that outputs the output signal of the second selection filter delayed by a prescribed delay time;

a third selection filter having a third pass band narrower than the first pass band that filters an input signal and outputs a filtered signal;

a second tuner that frequency-converts a signal received at a second antenna into a third signal and outputs the third signal to the third selection filter, and processes a signal input from the third selection filter into a fourth signal and outputs the fourth signal;

a second analog-to-digital converter that converts the fourth signal from analog to digital and outputs the converted fourth signal;

a fourth selection filter having a same pass band as the second pass band that filters an output signal of the second analog-to-digital converter and outputs a filtered signal; and a multipath equalizer that receives output signals of the delay compensator and the fourth selection filter, performs multipath equalization and outputs an equalized signal.

According to still another aspect of the present invention, there is provided: a receiving system, comprising:

a first selection filter having a first pass band centered on a carrier that filters an input signal and outputs a filtered signal;

a second selection filter having a second pass band narrower than the first pass band centered on the carrier that filters an input signal and outputs a filtered signal;

a first switching circuit that switches between an output signal of the first selection filter and an output signal of the second selection filter for output;

a first tuner that frequency-converts a signal received at a first antenna into a first signal and outputs the first signal to the first selection filter and the second selection filter, and processes a signal input from the first switching circuit into a second signal and outputs the second signal;

a first analog-to-digital converter that converts the second signal from analog to digital and outputs the converted second signal;

a third selection filter having a third pass band narrower than the second pass band centered on the carrier that filters an output signal of the first analog-to-digital converter and outputs a filtered signal;

a delay circuit that delays an output signal of the third selection filter and outputs a delayed signal;

a fourth selection filter having a fourth pass band narrower than the first pass band centered on the carrier that filters an input signal and outputs a filtered signal;

a second tuner that frequency-converts a signal received at a second antenna into a third signal and outputs the third signal to the fourth selection filter, and processes a signal input from the fourth selection filter into a fourth signal and outputs the fourth signal;

a second analog-to-digital converter that converts the fourth signal from analog to digital and outputs a converted fourth signal;

a fifth selection filter having a same pass band as the third pass band that filters an output signal of the second analog-to-digital converter and outputs a filtered signal;

a multipath equalizer that receives output signals of the delay circuit and the fifth selection filter, performs multipath equalization and outputs an equalized signal; and a controlling circuit that controls the first switching circuit and the delay circuit, wherein, when the first switching circuit outputs the output signal of the first selection filter, the controlling circuit makes the delay circuit output the output signal of the third selection filter delayed by a first delay time, and when the first switching circuit outputs the output signal of the second selection filter, the controlling circuit makes the delay circuit output the output signal of the third selection filter delayed by a second delay time.

BRIEF DESCRIPTION OF THE DRAWINGS

FIG. 11 is a table showing examples of different types of selection filters and their group delay times;

FIG. 12 is a table showing an exemplary correspondence between the control signal "Delay" and the delay time of the delay circuit 302.

DETAILED DESCRIPTION

In the following, embodiments of the present invention will be described with reference to the drawings.

First Embodiment

Figure 1:
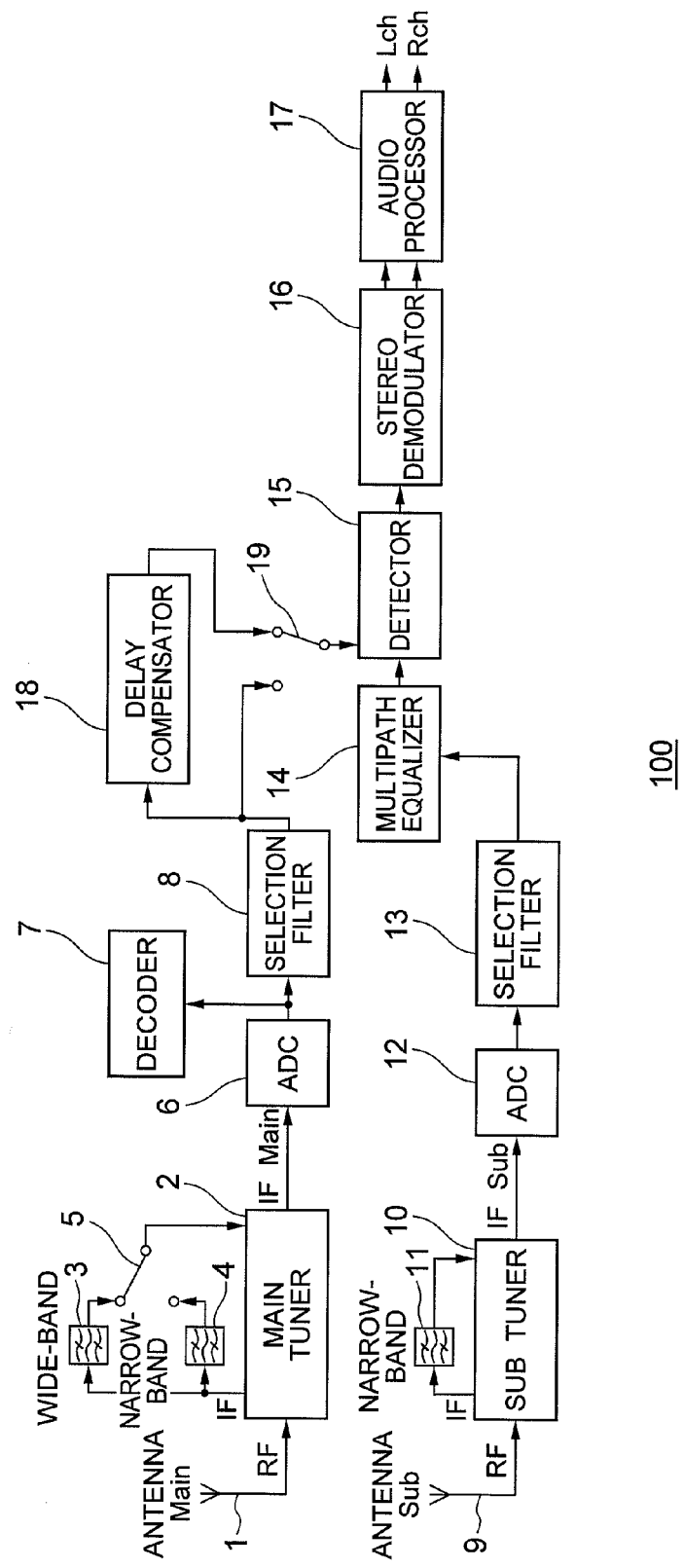
FIG. 1 is a block diagram showing an exemplary configuration of a receiver 100 according to a first embodiment of the present invention, which is an aspect of the present invention.

FIG. 1 is a block diagram showing an exemplary configuration of a receiver 100 according to a first embodiment of the present invention, which is an aspect of the present invention.

The receiver 100 has a first antenna 1, a first tuner 2, a first selection filter 3, a second selection filter 4, a first switching circuit 5, a first analog-to-digital converter 6, a decoder 7, a third selection filter 8, a second antenna 9, a second tuner 10, a fourth selection filter 11, a second analog-to-digital converter 12, a fifth selection filter 13, a multipath equalizer 14, a detector 15, a stereo demodulator 16, an audio processor 17, a delay compensator 18, and a second switching circuit 19.

The first antenna 1 receives a radio frequency (RF) signal, for example.

The first selection filter 3 is a wide-band selection filter having a first pass band centered on a carrier (a frequency modulation (FM) signal, for example). The first selection filter 3 filters a signal input from the first tuner 2 and provides the filtered signal to the first tuner 2 via the first switching circuit 5.

The first pass band covers digital radio broadcast signals and FM signals, for example. In this case, the first selection filter 3 is used when digital radio broadcasting (IBOC or the like) is to be received.

The second selection filter 4 is a narrow-band selection filter having a second pass band narrower than the first pass band centered on the same carrier. The second selection filter 4 filters a signal input from the first tuner 2 and provides the filtered signal to the first tuner 2 via the first switching circuit 5.

The second pass band does not cover digital radio broadcast signals, for example. Thus, the second selection filter 4 is used when FM radio signals are to be received.

As described later, the second selection filter 4 has a shorter group delay time in the second pass band than the first selection filter 3.

The first switching circuit 5 switches between the output signal of the first selection filter 3 and the output signal of the second selection filter 4 for output. This enables selection of a desired station.

The first tuner (main tuner) 2 frequency-converts the RF signal received at the first antenna into a first signal (intermediate frequency (IF) signal, for example) and outputs the first signal to the first selection filter 3 and the second selection filter 4.

In addition, the first tuner 2 processes the signal input from the first switching circuit 5 and outputs the resulting second signal (IF Main). The processing performed by the first tuner 2 may be frequency conversion or amplification, for example. However, the first tuner 2 may output the signal input from the first switching circuit 5 without change.

The first analog-to-digital converter 6 converts the second signal from analog to digital and outputs the resulting signal.

The decoder 7 decodes a signal component output from the first analog-to-digital converter 6 that passes through the first pass band and attenuates in the second pass band (the signal component of digital radio broadcasting, for example). Thus, digital radio broadcasting is reproduced based on the signal decoded by the decoder 7 designed for IBOC, for example.

The third selection filter 8 has a third pass band narrower than the second pass band centered on the same carrier. The third selection filter 8 filters the output signal of the first analog-to-digital converter 6 and outputs the filtered signal.

Figure 2:
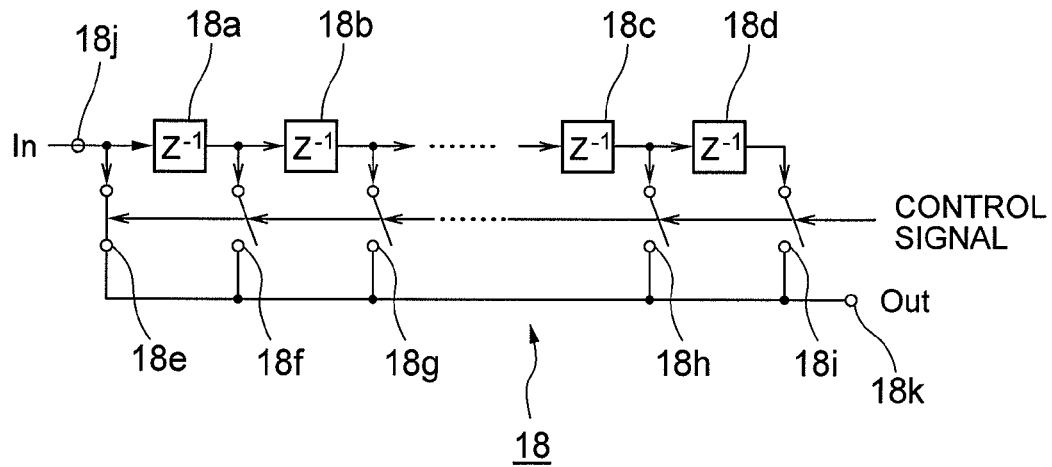
FIG. 2 is a circuit diagram showing an exemplary configuration of the delay compensator 18 shown in FIG. 1.

The delay compensator 18 delays the output signal of the third selection filter 8 by a prescribed delay time and outputs the delayed signal FIG. 2 is a circuit diagram showing an exemplary configuration of the delay compensator 18 shown in FIG. 1.

The delay compensator 18 has a plurality of delay circuits 18a to 18d that delay an input signal by a prescribed period of time and output the delayed signal, a plurality of switching elements 18e to 18i turned on and off under control of a control signal, an input terminal 18j and an output terminal 18k.

The output signal of the third selection filter 8 is input to the input terminal 18j.

The delay circuits 18a to 18d are connected in series between the input terminal 18j and the output terminal 18k.

The switching element 18e is connected between the input terminal 18j and the output terminal 18k. The switching element 18f is connected between the output of the delay circuit 18a and the output terminal 18k. The switching element 18g is connected between the output of the delay circuit 18b and the output terminal 18k. The switching element 18h is connected between the output of the delay circuit 18c and the output terminal 18k. The switching element 18i is connected between the output of the delay circuit 18d and the output terminal 18k.

The control signal controls the on/off state of the switching elements 18e to 18i, thereby changing the number of delay circuits through which the signal input to the input terminal 18j passes. In this way, the delay time of the delay compensator 18 is controlled to be a desired value.

As described above, the delay compensator 18 controls the on/off state of the switching elements 18e to 18h based on the control signal to delay the output signal of the third selection filter 8 by a desired delay time and outputs the delayed signal from the output terminal 18k.

Figure 3:
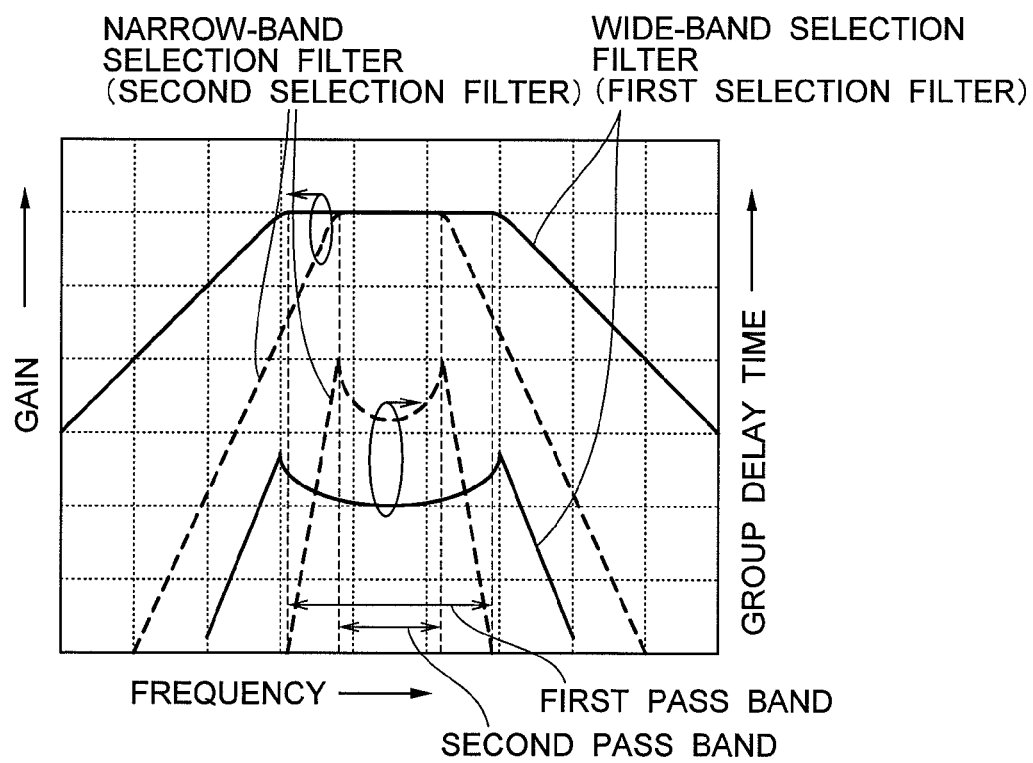
FIG. 3 is a graph showing exemplary frequency characteristics of the wide-band selection filter and the narrow-band selection filter.

FIG. 3 is a graph showing exemplary frequency characteristics of the wide-band selection filter and the narrow-band selection filter.

As shown in FIG. 3, the wide-band selection filter achieves high gain over a wider frequency range and a smaller absolute value of the group delay time (GDT).

On the other hand, the narrow-band selection filter achieves high gain over a narrower frequency range and has a greater absolute value of the group delay time.

When these selection filters are used in combination, a time difference occurs between the signals input to the multipath equalizer from the main tuner and the sub tuner.

The delay compensator 18 according to the present invention corrects the delay time of the main tuner (first tuner 2) using the wide-band selection filter (first selection filter 3) having a smaller absolute value of the group delay time.

The delay time of the delay compensator 18 is determined based on the difference between the group delay time of the second selection filter 4 in the second pass band and the group delay time of the first selection filter 3 in the second pass band. In this embodiment, for example, the delay time of the delay compensator 18 is the difference between the group delay time of the second selection filter 4 in the second pass band and the group delay time of the first selection filter 3 in the second pass band.

As shown in FIG. 1, the second switching circuit 19 switches between the output signal of the third selection filter 8 and the output signal of the delay compensator 18 for output.

The second antenna 9 is arranged at a predetermined distance from the first antenna 1. The second antenna 9 is the same as the first antenna 1 in that it receives an RF signal, for example.

The pass band of the fourth selection filter 11 is the same as the second pass band of the second selection filter 4. The fourth selection filter 11 filters the signal input from the second tuner 10 and outputs the filtered signal to the second tuner 10.

The second tuner (sub tuner) 10 frequency-converts the signal received at the second antenna 9 into a third signal (IF) and outputs the third signal to the fourth selection filter 11.

In addition, the second tuner 10 processes the signal input from the fourth selection filter 11 and outputs the resulting fourth signal (IF Sub). As with the first tuner 2, although the processing performed by the second tuner 10 may be frequency conversion or amplification, for example, the second tuner 10 may also output the input signal without change.

The second analog-to-digital converter 12 converts the fourth signal from analog to digital and outputs the resulting signal.

The pass band of the fifth selection filter 13 is the same as the third pass band of the third selection filter 8. The fifth selection filter 13 filters the output signal of the second analog-to-digital converter 12 and outputs the filtered signal.

The multipath equalizer 14 receives the outputs signals of the second switching circuit 19 and the fifth selection filter 13, performs multipath equalization and outputs the resulting equalized signals.

When the first switching circuit 5 outputs the signal from the first selection filter 3, the second switching circuit 19 switches to output the output signal of the delay compensator 18, and therefore, the two signals input to the multipath equalizer 14 have an equal delay time.

The detector 15 detects the output signal of the multipath equalizer 14 (performs FM detection, for example) and outputs the detected signal (composite signal).

The stereo demodulator 16 separates the output signal of the detector 15 into an L signal and an R signal (stereo signals) and outputs the L and R signals.

The audio processor 17 processes the L and R signals from the stereo demodulator 16 and outputs the resulting audio signals. The processing performed by the audio processor 17 may be blending by interference, high-frequency cutoff or soft muting, for example.

Based on the audio signals (Lch, Rch) output from the audio processor 17, analog radio broadcasting (FM radio broadcasting, for example) is reproduced. Note that the analog radio broadcasting is selectively reproduced in the case where the sensitivity of receiving digital radio broadcasting is low.

Next, an exemplary operation of the receiver 100 configured as described above will be described.

First, a case where the receiver 100 receives digital radio broadcasting will be described.

In this case, the first switching circuit 5 switches to the first selection filter 3.

Thus, signal components output from the first analog-to-digital converter 6 include a signal component that passes through the first pass band and attenuates in the second pass band (a signal component of digital radio broadcasting, for example).

Of the signal components output from the first analog-to-digital converter, the decoder 7 decodes the signal component that passes through the first pass band and attenuates in the second pass band (a signal component of digital radio broadcasting, for example).

As described above, based on the decoded signal output from the decoder 7 designed for IBOC, for example, digital radio broadcasting is reproduced.

In this case, furthermore, the second switching circuit 19 switches to output the output signal of the delay compensator 18.

Since the second switching circuit 19 switches to output the output signal of the delay compensator 18 as described above, the two signals input to the multipath equalizer 14 in the receiver 100 have an equal delay time. The signal components output from the delay compensator 18 and the fifth selection filter 13 include a signal component that passes through the third pass band (a signal component of FM radio broadcasting, for example).

Then, based on the two signals having an equal delay time, the multipath equalizer 14 removes multipath. Then, based on the signal from which multipath is removed, the detector 15, the stereo demodulator 16 and the audio processor 17 cooperate to output an audio signal. Based on the audio signal, FM radio broadcasting is reproduced, for example.

Next, a case where the receiver 100 does not receive digital radio broadcasting will be described.

In this case, the first switching circuit 5 switches to the second selection filter 4. In addition, the second switching circuit 19 switches to the third selection filter 8.

Thus, the output signals from the third selection filter 8 and the fifth selection filter 13 are input to the multipath equalizer 14. As described above, the second selection filter 4 and the fourth selection filter 11 have the same pass band. Therefore, the two signals input to the multipath equalizer 14 in the receiver 100 have an equal delay time. The signal components output from the third and fifth selection filters 8 and 13 include a signal component that passes through the third pass band (a signal component of FM radio broadcasting, for example).

Then, based on the two signals having an equal delay time, the multipath equalizer 14 removes multipath. Then, based on the signal from which multipath is removed, the detector 15, the stereo demodulator 16 and the audio processor 17 cooperate to output an audio signal. Based on the audio signal, analog radio broadcasting is reproduced.

Next, the effectiveness of the delay compensation in the case where digital radio broadcasting is received will be considered.

Figure 4:
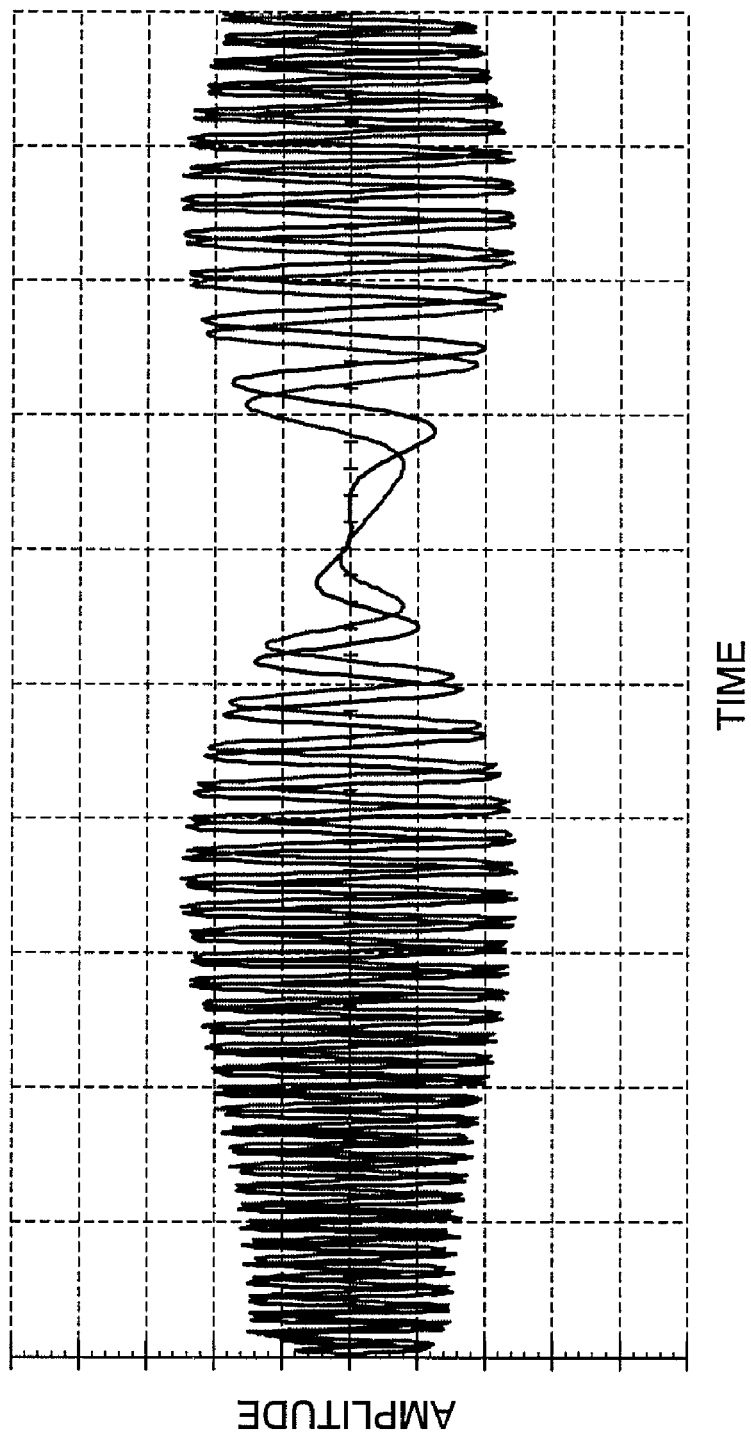
FIG. 4 is a graph showing waveforms of output signals of the main tuner using the wide-band filter.
Figure 5:
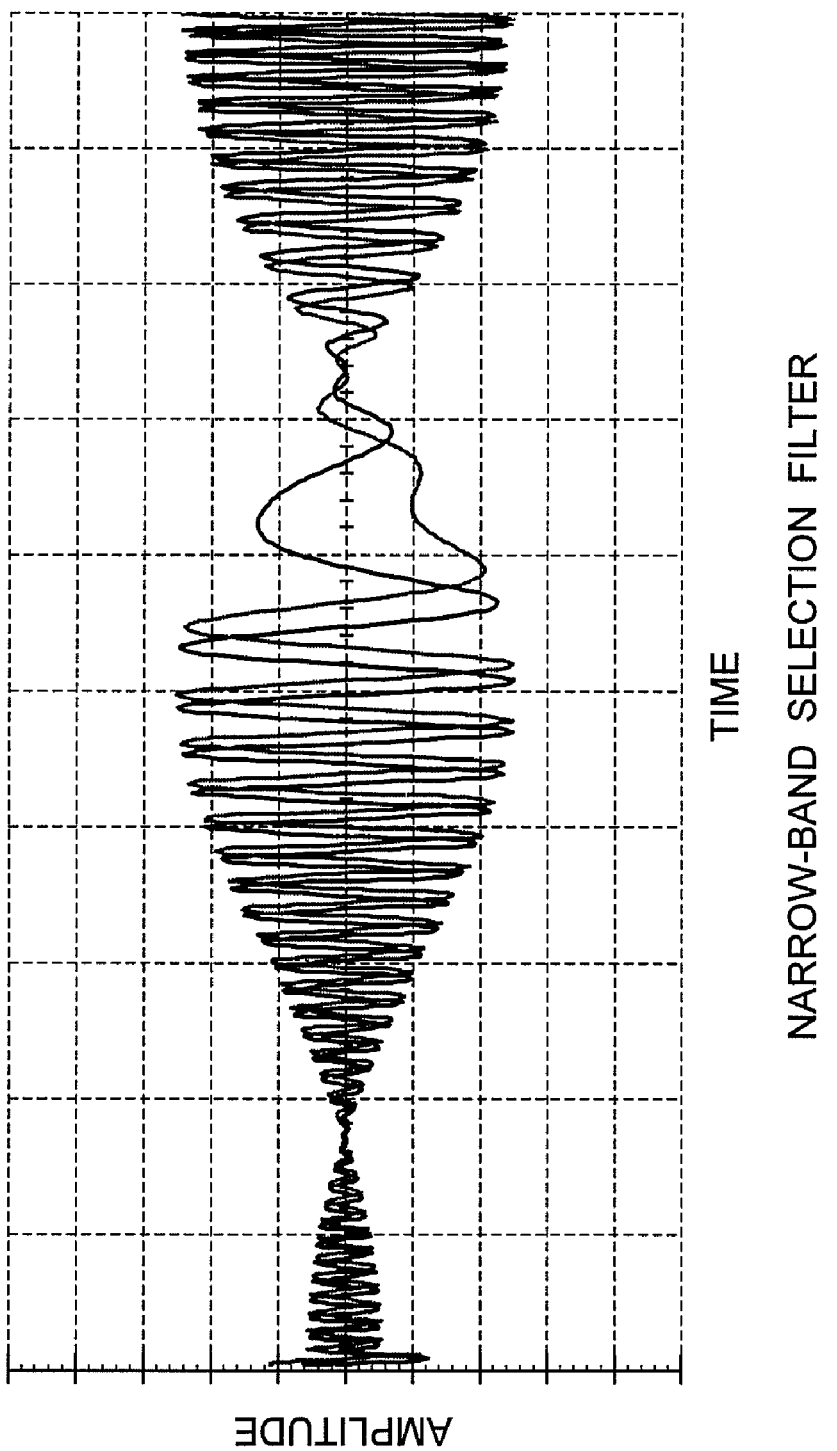
FIG. 5 is a graph showing waveforms of output signals of the sub tuner using the narrow-band filter.

FIG. 4 is a graph showing waveforms of output signals of the main tuner using the wide-band filter. FIG. 5 is a graph showing waveforms of output signals of the sub tuner using the narrow-band filter.

The signals shown in FIGS. 4 and 5 are FM signals including multipath signals.

Figure 6:
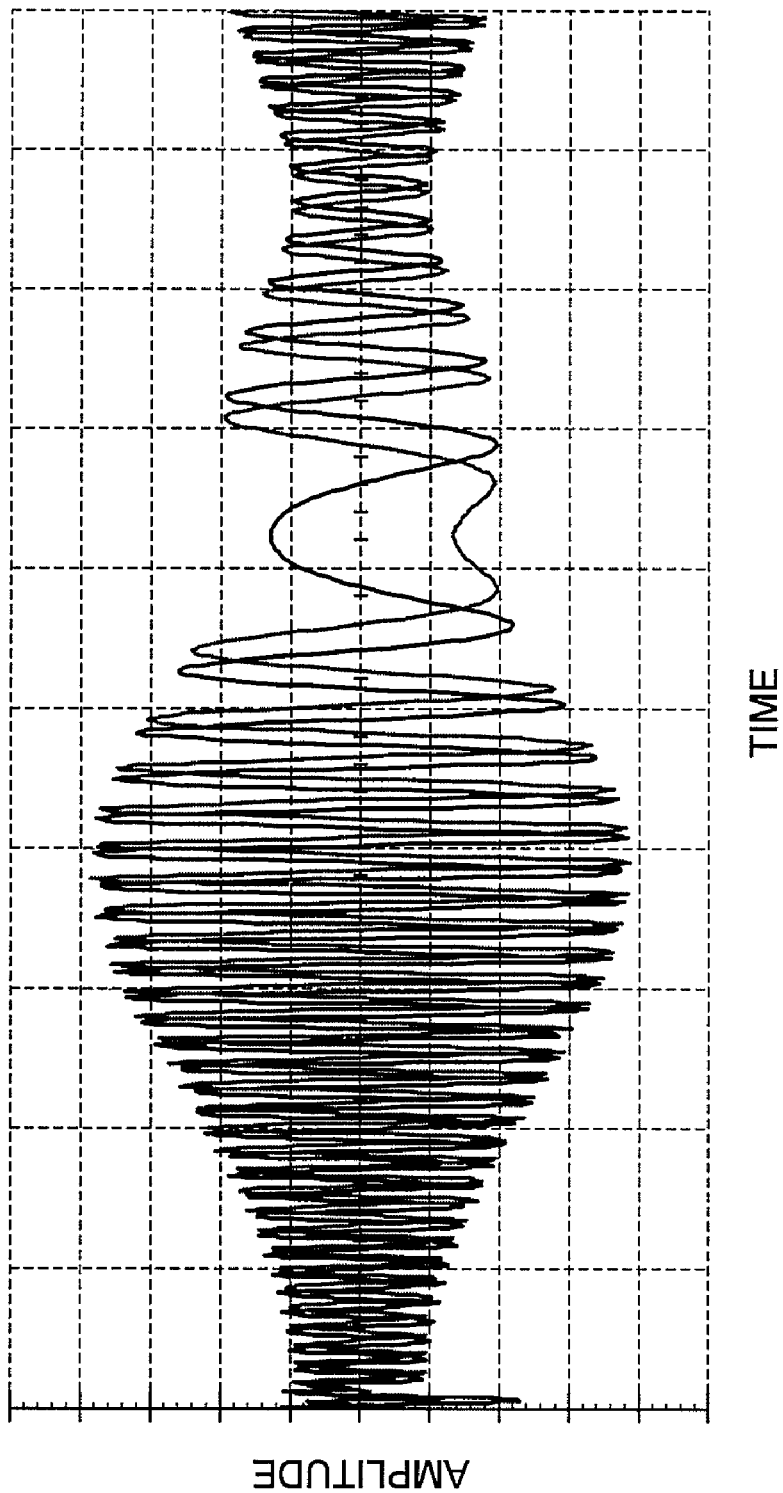
FIG. 6 is a graph showing waveforms of FM signals output from the multipath equalizer in a case where delay compensation is not performed on the signals shown in FIG. 4, and the signals shown in FIG. 5 are equalized by the multipath equalizer.

First, a case where delay compensation is not performed will be described. FIG. 6 is a graph showing waveforms of FM signals output from the multipath equalizer in a case where delay compensation is not performed on the signals shown in FIG. 4, and the signals shown in FIG. 5 are equalized by the multipath equalizer.

The FM signals equalized by the multipath equalizer would otherwise have a constant envelope. However, as shown in FIG. 6, an AM ripple occurs in the FM signals. As can be seen, if delay compensation is not performed on the output signals on the side of the main tuner, the multipath removal characteristics deteriorate.

Next, a case where delay compensation is performed for the main tuner using the wide-band filter will be considered.

Figure 7:
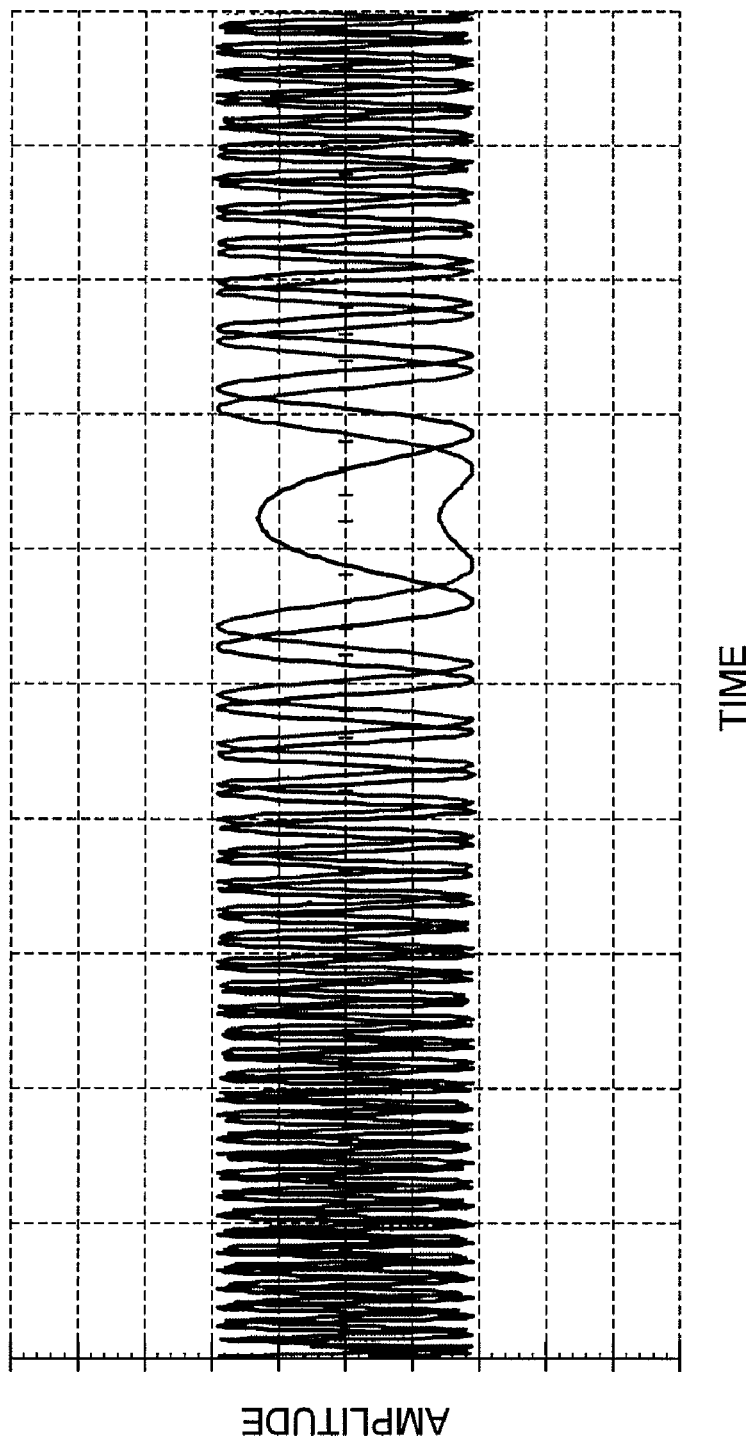
FIG. 7 is a graph showing waveforms of the FM signals output from the multipath equalizer in a case where delay compensation is performed on the signals shown in FIG. 4, and the signals shown in FIG. 5 are equalized by the multipath equalizer.

FIG. 7 is a graph showing waveforms of the FM signals output from the multipath equalizer in a case where delay compensation is performed on the signals shown in FIG. 4, and the signals shown in FIG. 5 are equalized by the multipath equalizer.

As can be seen from the drawing, the FM signals equalized by the multipath equalizer have no ripple caused by multipath and have a constant envelope.

As described above, by performing delay compensation on the output signal from the main tuner using the wide-band filter, the decrease in the effect of multipath equalization can be reduced.

Next, characteristics of the audio output of the receiver will be considered. In the following description, a two-path model multipath is assumed, in which the phase of both the main antenna and the sub antenna is fixed at 0 degrees for the first path, and the phase of the main antenna is fixed at 100 degrees for the second path.

Figure 8:
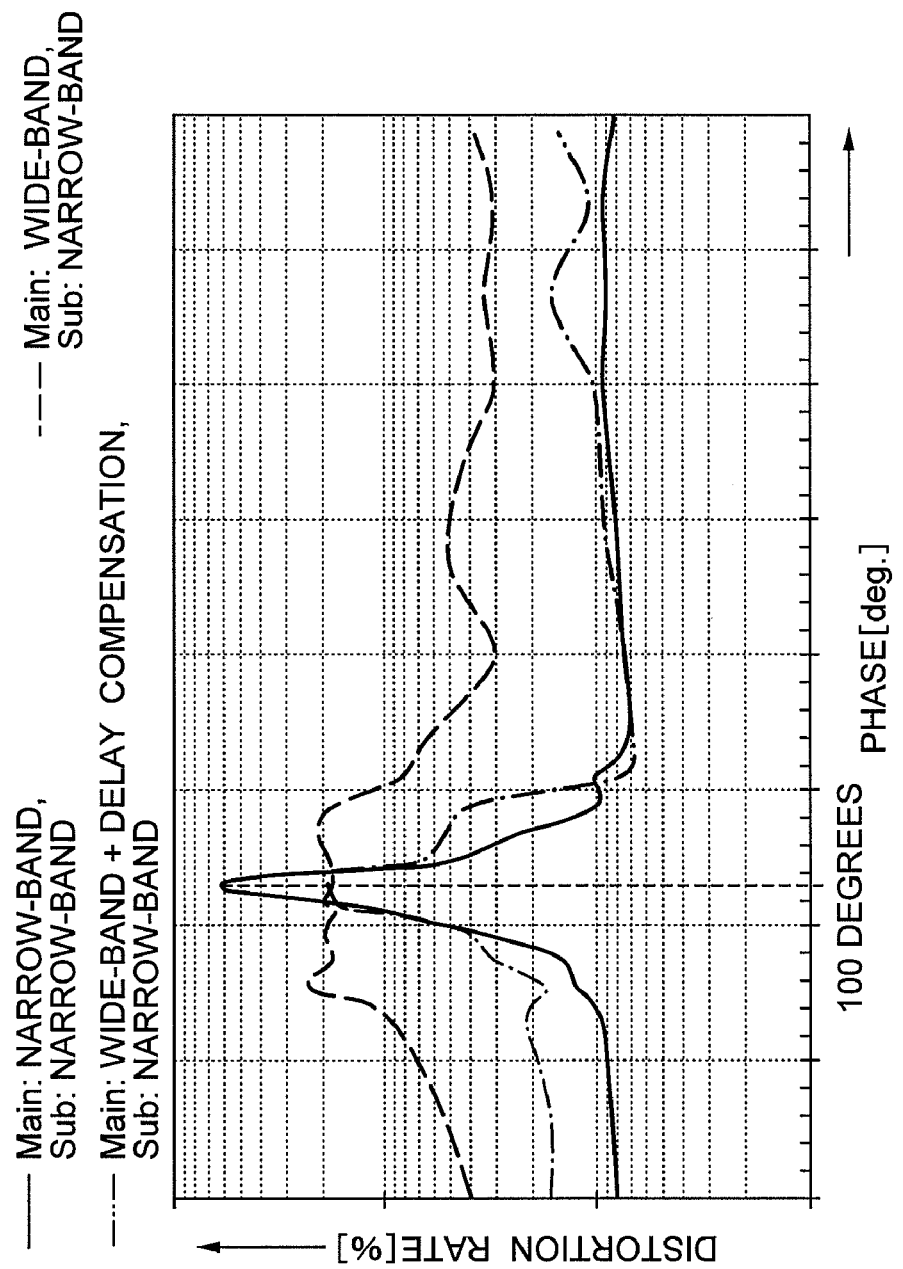
FIG. 8 is a graph showing distortion characteristics of the audio output of the receiver.

FIG. 8 is a graph showing distortion characteristics of the audio output of the receiver. In FIG. 8, the abscissa indicates the phase of the sub antenna, and the ordinate indicates the distortion rate of the audio output of the receiver.

In FIG. 8, the solid line indicates the characteristics of the audio output of the receiver in a case where both the main tuner and the sub tuner use the narrow-band filter.

As is indicated by the solid line, under the condition that the phase of the sub antenna for the second path is 100 degrees, the main antenna and the sub antenna have the same phase conditions. Thus, multipath cannot be removed, and the distortion rate increases. When the phase of the main antenna and the phase of the sub antenna differ from each other, multipath can be removed.

The dashed line indicates the characteristics in a case where the main tuner uses the wide-band selection filter, the sub tuner uses the narrow-band selection filter, and delay compensation is not performed on the output signal of the main tuner.

As can be seen, the distortion rate indicated by the dashed line is significantly higher than the distortion rate indicated by the solid line. That is, when the main tuner uses the wide-band selection filter, and delay compensation is not performed on the output signal of the main tuner, the effect of multipath equalization decreases.

The alternate long and two short dashes line indicates the characteristics in a case where the main tuner uses the wide-band selection filter, the sub tuner uses the narrow-band selection filter, and delay compensation is performed on the output signal of the main tuner.

As can be seen, the distortion rate indicated by the alternate long and two dashes line is lower than the distortion rate indicated by the dashed line and is closer to the distortion rate indicated by the solid line. That is, it can be considered that, when the main tuner uses the wide-band selection filter, and delay compensation is performed on the output signal of the main tuner, the decrease in the effect of multipath equalization is reduced.

As described above, the receiver according to this embodiment can reduce the decrease in the effect of multipath equalization.

Second Embodiment

In the arrangement according to the first embodiment generally described above, one of two selection filters connected to the main tuner is selectively used.

However, if the receiver needs only to be able to receive digital radio broadcasting, the main tuner has only to have the wide-band selection filter (first selection filter).

Thus, in a second embodiment described below, a receiver that does not have the narrow-band selection filter (second selection filter) and the first and second switching circuits will be described.

Figure 9:
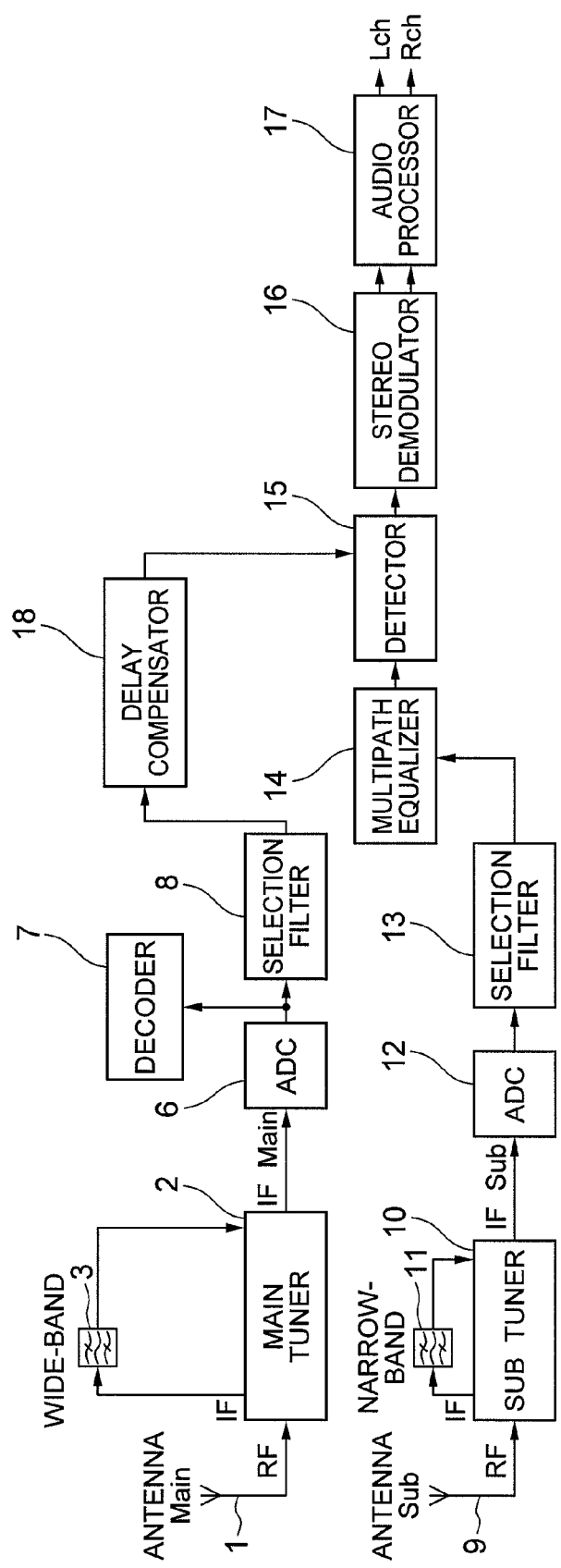
FIG. 9 is a block diagram showing an exemplary configuration of a receiver 200 according to the second embodiment of the present invention, which is an aspect of the present invention.

FIG. 9 is a block diagram showing an exemplary configuration of a receiver 200 according to the second embodiment of the present invention, which is an aspect of the present invention.

The receiver 200 has a first antenna 1, a first tuner 2, a first selection filter 3, a first analog-to-digital converter 6, a decoder 7, a third selection filter 8, a second antenna 9, a second tuner 10, a fourth selection filter 11, a second analog-to-digital converter 12, a fifth selection filter 13, a multipath equalizer 14, a detector 15, a stereo demodulator 16, an audio processor 17, a delay compensator 18, and a second switching circuit 19.

The first tuner (main tuner) 2 frequency-converts the RF signal received at the first antenna into a first signal (IF signal, for example) and outputs the first signal to the first selection filter 3.

In addition, the first tuner 2 processes the signal input from the first selection filter 3 and outputs the resulting second signal (IF Main). The processing performed by the first tuner 2 may be frequency conversion or amplification, for example. However, the first tuner 2 may output the signal input from the first selection filter 3 without change.

The multipath equalizer 14 receives the output signals of the delay compensator 18 and the fifth selection filter 13, performs multipath equalization and outputs the resulting equalized signals.

As described above, the receiver 200 has the same configuration as the receiver 100 according to the first embodiment except that the second selection filter 4 and the first and second switching circuits 5 and 19 are omitted.

Next, an exemplary operation of the receiver 200 receiving digital radio broadcasting will be described.

In the second embodiment, as described above, the first tuner 2 outputs the second signal, which is formed by processing the signal input from the first selection filter 3.

Therefore, signal components output from the first analog-to-digital converter 6 include a signal component that passes through the first pass band and attenuates in the second pass band (a signal component of digital radio broadcasting, for example).

Of the signal components output from the first analog-to-digital converter, the decoder 7 decodes the signal component that passes through the first pass band and attenuates in the second pass band (a signal component of digital radio broadcasting, for example).

As described above, based on the decoded signal output from the decoder 7 designed for IBOC, for example, digital radio broadcasting is reproduced.

Furthermore, in the second embodiment, the multipath equalizer 14 receives the output signals of the delay compensator 18 and the fifth selection filter 13.

Thus, the two signals input to the multipath equalizer 14 in the receiver 200 have an equal delay time. The signal components output from the delay compensator 18 and the fifth selection filter 13 include a signal component that passes through the third pass band (a signal component of FM radio broadcasting, for example).

Then, based on the two signals having an equal delay time, the multipath equalizer 14 removes multipath. Then, based on the signal from which multipath is removed, the detector 15, the stereo demodulator 16 and the audio processor 17 cooperate to output an audio signal and reproduce FM radio broadcasting.

As described above, the receiver according to this embodiment can reduce the decrease in the effect of multipath equalization.

Third Embodiment

In a third embodiment, an exemplary configuration of a receiving system additionally provided with a controlling circuit that controls switching between the two selection filters connected to the main tuner and the delay compensator will be described.

Figure 10:
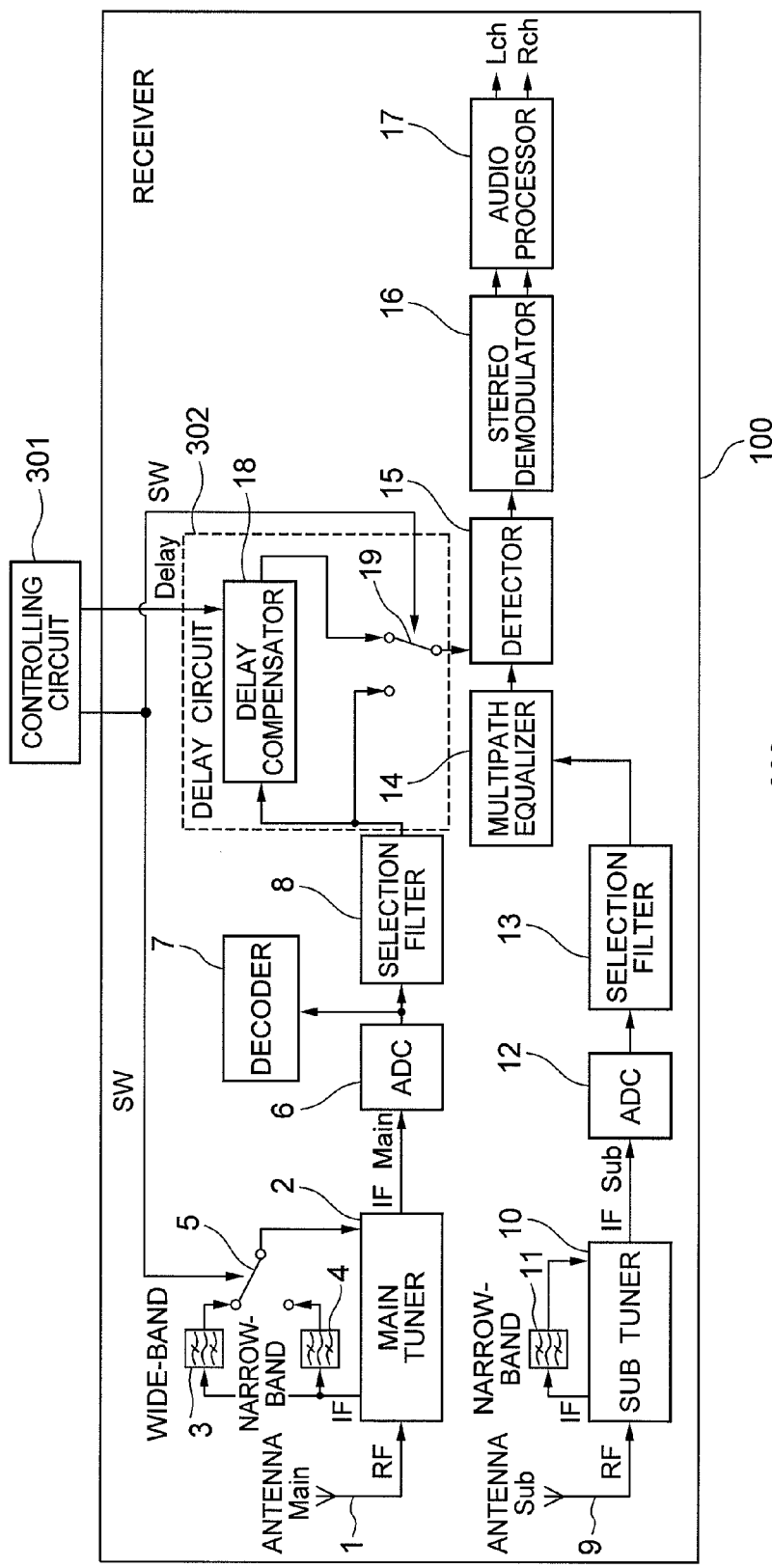
FIG. 10 is a block diagram showing an exemplary configuration of a receiving system 300 according to the third embodiment of the present invention, which is an aspect of the present invention.

FIG. 10 is a block diagram showing an exemplary configuration of a receiving system 300 according to the third embodiment of the present invention, which is an aspect of the present invention. In FIG. 10, the same reference numerals as those in FIG. 1 denote the same parts as those in the first embodiment.

The receiving system 300 has the receiver 100 according to the first embodiment and a controlling circuit 301.

In the third embodiment, the delay compensator 18 that delays the output signal of the third selection filter 8 by a first delay time or a second delay time and outputs the delayed signal and the second switching circuit 19 capable of switching between the third selection filter 8 and the delay compensator 18 form a delay circuit 302.

That is, the delay circuit 302 can output the output signal of the third selection filter 8 delayed by a predetermined delay time as required.

The controlling circuit 301 controls the operation of the first switching circuit 5 and the delay circuit 302. That is, the controlling circuit 301 outputs control signals "SW" and "Delay" to control the operation of the first switching circuit 5, the second switching circuit 19, and the delay compensator 18.

For example, when the first switching circuit 5 outputs the output signal of the first selection filter 3, the controlling circuit 301 outputs the control signal "Delay" that makes the delay circuit 302 output the output signal of the third selection filter 8 delayed by a first delay time "A".

The first delay time "A" is determined based on the difference between the group delay time of the second selection filter 4 and the group delay time of the first selection filter 3.

On the other hand, when the first switching circuit 5 outputs the output signal of the second selection filter 4, the controlling circuit 301 outputs the control signal "Delay" that makes the delay circuit 302 output the output signal of the third selection filter 8 delayed by a second delay time "0".

The second delay time "0" is determined based on the difference between the group delay time of the second selection filter 4 and the group delay time of the fourth selection filter 11.

FIG. 11 is a table showing examples of different types of selection filters and their group delay times. FIG. 12 is a table showing an exemplary correspondence between the control signal "Delay" and the delay time of the delay circuit 302.

As shown in FIG. 11, for example, when the first selection filter 3 is of "Type 1", and the second selection filter 4 is of "Type 2", the first delay time is the difference "W-X" between the group delay time "X" of the second selection filter 4 and the group delay time "W" of the first selection filter 3. The difference "W-X" is set at the delay time "A" in FIG. 12, for example.

Alternatively, for example, when the first selection filter 3 is of "Type 2", and the second selection filter 4 is also of "Type 2", the second delay time is the difference "X-X" between the group delay time "X" of the second selection filter 4 and the group delay time "X" of the fourth selection filter 11, which equals to 0. The difference "X-X", which equals to 0, is set at the delay time "0" in FIG. 12, for example.

The table shown in FIG. 12 is previously stored in the controlling circuit 301. The controlling circuit 301 sets the delay time of the delay compensator 18 according to the group delay times "W" to "Z" of the selection filters "Type 1" to "Type 4".

The fourth selection filter 11 has a fourth pass band narrower than the first pass band centered on the same carrier. The fourth selection filter 11 filters the signal input from the second tuner 10 and outputs the filtered signal to the second tuner 10. For example, as in the first embodiment, the fourth pass band may be the same as the second pass band.

Figure 13:
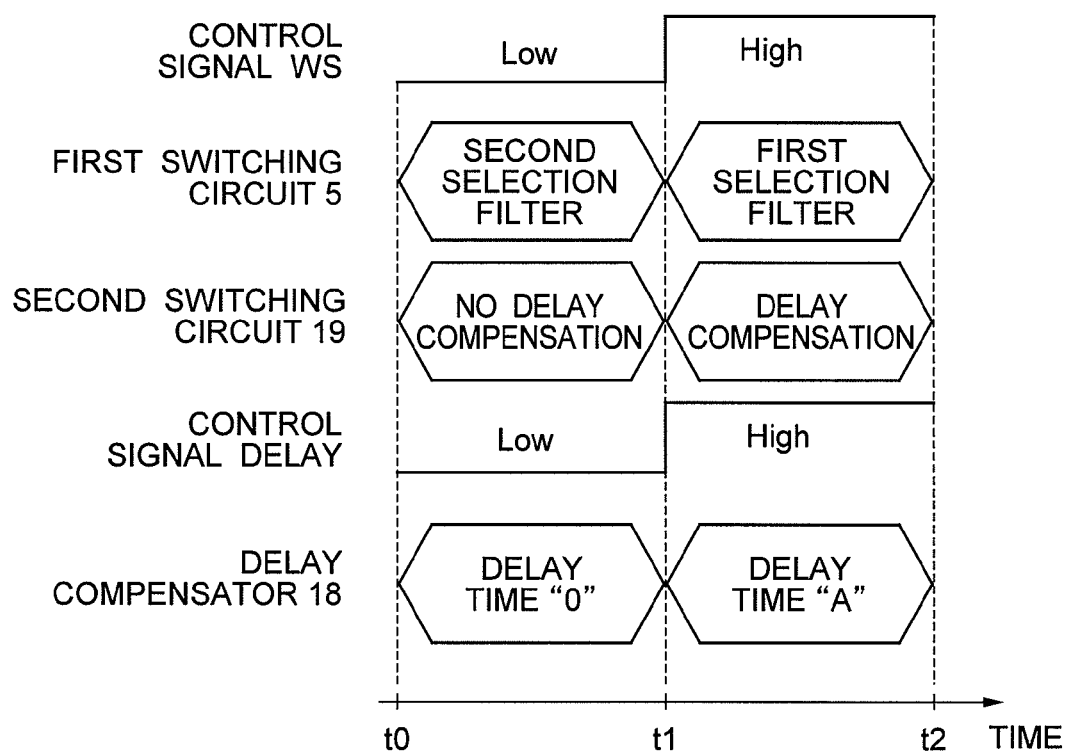
FIG. 13 is a timing chart for illustrating an example of the control operation performed by the controlling circuit 301 of the receiving system 300.

Next, an exemplary operation of the receiving system 300 configured as described above will be described. FIG. 13 is a timing chart for illustrating an example of the control operation performed by the controlling circuit 301 of the receiving system 300.

A case where the receiver 100 does not receive digital radio broadcasting will be described.

In this case, as shown in FIG. 13, when the control signal "SW" is at "Low" level (in a period from "t0" to "t1"), the first switching circuit 5 outputs the output signal of the second selection filter 4, and the second switching circuit 19 outputs the output signal of the third selection filter 8. Furthermore, the control signal "Delay" is at "Low" level, so that the delay time of the delay compensator 18 is set at the second delay time "0" (which equals to 0 in this embodiment).

The second switching circuit 19, and the path bypassing the delay compensator 18, may be omitted. In this case, the delay circuit 302 outputs the output signal of the third selection filter 8 delayed by the delay compensator 18 by the second delay time "0".

Thus, the output signals of the third selection filter 8 and the fifth selection filter 13 are input to the multipath equalizer 14. Since the second selection filter 8 and the fourth selection filter 11 has the same pass band, the two signals input to the multipath equalizer 14 in the receiver 100 have an equal delay time. The signal components output from the third selection filter 8 and the fifth selection filter 13 include a signal component that passes through the third pass band (a signal component of FM radio broadcasting, for example).

Then, based on the two signals having an equal delay time, the multipath equalizer 14 removes multipath. Then, based on the signal from which multipath is removed, the detector 15, the stereo demodulator 16 and the audio processor 17 cooperate to output an audio signal and reproduces analog radio broadcasting.

Next, a case where the receiver 100 receives digital radio broadcasting will be described.

In this case, as shown in FIG. 13, when the control signal "SW" is at "High" level (in a period from "t1" to "t2"), the first switching circuit 5 outputs the output signal of the first selection filter 3, and the second switching circuit 19 outputs the output signal of the delay compensator 18. Furthermore, the control signal "Delay" is at "High" level, so that the delay time of the delay compensator 18 is set at the first delay time "A".

Thus, the delay circuit 302 outputs the output signal of the third selection filter 8 delayed by the delay compensator 18 by the first delay time "A".

As described above, in the case where the second switching circuit 19 and the path bypassing the delay compensator 18 are omitted, the delay circuit 302 outputs the output signal of the third selection filter 8 delayed by the delay compensator 18 by the first delay time "A".

Thus, the signal components output from the first analog-to-digital converter 6 include a signal component that passes through the first pass band and attenuates in the second pass band (a signal component of digital radio broadcasting, for example).

Of the signal components output from the first analog-to-digital converter, the decoder 7 decodes the signal component that passes through the first pass band and attenuates in the second pass band (a signal component of digital radio broadcasting, for example).

For example, based on the decoded signal output from the decoder 7 designed for IBOC, digital radio broadcasting is reproduced.

Since the second switching circuit 19 switches to output the output signal of the delay compensator 18, the two signals input to the multipath equalizer 14 in the receiver 100 have an equal delay time.

The signal components output from the delay compensator 18 and the fifth selection filter 13 include a signal component that passes through the third pass band (a signal component of FM radio broadcasting, for example).

Then, based on the two signals having an equal delay time, the multipath equalizer 14 removes multipath. Then, based on the signal from which multipath is removed, the detector 15, the stereo demodulator 16 and the audio processor 17 cooperate to output an audio signal and reproduce FM radio broadcasting, for example.

Thus, as in the first embodiment, the receiving system 300 can reduce the decrease in the effect of multipath equalization by compensating for the delay of the output signal of the main tuner using the wide-band filter.

As described above, the receiving system according to this embodiment can reduce the decrease in the effect of multipath equalization.

What is claimed is:

1. A receiver comprising:
   a first selection filter comprising a first pass band substantially in the center of a carrier configured to filter an input signal and to output a filtered signal;
   a second selection filter comprising a second pass band narrower than the first pass band substantially at the center of the carrier configured to filter an input signal and to output a filtered signal;
   a first switching circuit configured to switch a first output signal between an output signal of the first selection filter and an output signal of the second selection filter;
   a first tuner configured to frequency-convert a signal from a first antenna into a first signal, to output the first signal to the first selection filter and the second selection filter, to process the first output signal from the first switching circuit into a second signal, and to output the second signal;
   a first analog-to-digital converter configured to convert the second signal from analog to digital and to output the converted second signal;
   a third selection filter comprising a third pass band narrower than the second pass band substantially at the center of the carrier configured to filter an output signal of the first analog-to-digital converter, and to output a filtered signal;
   a delay compensator configured to output the output signal of the third selection filter delayed by a predetermined delay time;
   a second switching circuit configured to switch a second output signal between the output signal of the third selection filter and the signal output from the delay compensator;
   a fourth selection filter comprising a same pass band as the second pass band configured to filter an input signal and to output a filtered signal;
   a second tuner configured to frequency-convert a signal from a second antenna into a third signal, to output the third signal to the fourth selection filter, to process a signal from the fourth selection filter into a fourth signal and to output the fourth signal;
   a second analog-to-digital converter configured to convert the fourth signal from analog to digital and to output the converted fourth signal;
   a fifth selection filter comprising a same pass band as the third pass band configured to filter an output signal of the second analog-to-digital converter and to output a filtered signal; and
   a multipath equalizer configured to receive output signals of the second switching circuit and the fifth selection filter, to execute multipath equalization, and to output an equalized signal.

2. The receiver of claim 1, wherein the second switching circuit is configured to switch the second output signal to the output signal of the delay compensator, when the first switching circuit outputs the output signal of the first selection filter, and
   the second switching circuit is configured to switch the second output signal to the output signal of the third selection filter when the first switching circuit outputs the output signal of the second selection filter.

3. The receiver of claim 2, further comprising:
   a decoder configured to decode a portion of a signal that has passed through the first pass band and attenuated in the second pass band from the first analog-to-digital converter;
   a detector configured to detect the output signal of the multipath equalizer and to output a detected signal;
   a stereo demodulator configured to separate an output signal of the detector into an L signal and an R signal and to output the L signal and the R signal; and
   an audio processor configured to process the L signal and the R signal from the stereo demodulator and to output an audio signal.

4. The receiver of claim 3, wherein the predetermined delay time is determined based on a difference between a group delay time of the second selection filter in the second pass band and a group delay time of the first selection filter in the second pass band.

5. The receiver of claim 2, wherein the predetermined delay time is based on a difference between a group delay time of the second selection filter in the second pass band and a group delay time of the first selection filter in the second pass band.

6. The receiver of claim 1, further comprising:
   a decoder configured to decode a portion of a signal that has passed through the first pass band and attenuated in the second pass band from the first analog-to-digital converter;
   a detector configured to detect the output signal of the multipath equalizer and to output a detected signal;
   a stereo demodulator configured to separate an output signal of the detector into an L (left) signal and an R (right) signal and to output the L signal and the R signal; and
   an audio processor configured to process the L signal and the R signal from the stereo demodulator and to output an audio signal.

7. The receiver of claim 6, wherein the predetermined delay time is based on a difference between a group delay time of the second selection filter in the second pass band and a group delay time of the first selection filter in the second pass band.

8. The receiver of claim 1, wherein the predetermined delay time is based on a difference between a group delay time of the second selection filter in the second pass band and a group delay time of the first selection filter in the second pass band.

9. The receiver of claim 1, wherein the carrier is a frequency modulation (FM) signal.

10. A receiver comprising:
    a first selection filter comprising a first pass band substantially at the center of a carrier configured to filter an input signal and to output a filtered signal;
    a first tuner configured to frequency-convert a signal from a first antenna into a first signal, to output the first signal to the first selection filter, and to process a signal input from the first selection filter into a second signal and to output the second signal;
    a first analog-to-digital converter configured to convert the second signal from analog to digital and to output the converted second signal;
    a second selection filter comprising a second pass band narrower than the first pass band substantially at the center of the carrier configured to filter an output signal of the first analog-to-digital converter and outputs a filtered signal;
    a delay compensator configured to output the output signal of the second selection filter delayed by a predetermined delay time;

a third selection filter comprising a third pass band narrower than the first pass band configured to filter an input signal and to output a filtered signal;

a second tuner configured to frequency-convert a signal from a second antenna into a third signal, output the third signal to the third selection filter, and to process a signal input from the third selection filter into a fourth signal, and to output the fourth signal;

a second analog-to-digital converter configured to convert the fourth signal from analog to digital and to output the converted fourth signal;

a fourth selection filter comprising a same pass band as the second pass band configured to filter an output signal of the second analog-to-digital converter and to output a filtered signal; and a multipath equalizer configured to receive output signals of the delay compensator and the fourth selection filter, to execute multipath equalization and to output an equalized signal.

11. The receiver of claim 10, further comprising:

a decoder configured to decode a portion of signal that has passed through the first pass band and attenuated in the second pass band from the first analog-to-digital converter;

a detector configured to detect the output signal of the multipath equalizer and to output a detected signal;

a stereo demodulator configured to separate an output signal of the detector into an L signal and an R signal and to output the L signal and the R signal; and an audio processor configured to process the L signal and the R signal from the stereo demodulator and to output an audio signal.

12. A receiving system, comprising:

a first selection filter comprising a first pass band substantially at a center of a carrier configured to filter an input signal and to output a filtered signal;

a second selection filter comprising a second pass band narrower than the first pass band substantially at the center of the carrier configured to filter an input signal and to output a filtered signal;

a first switching circuit configured to switch a first output signal between an output signal of the first selection filter and an output signal of the second selection filter;

a first tuner configured to frequency-convert a signal from a first antenna into a first signal and outputs the first signal to the first selection filter and the second selection filter, to process the first output signal from the first switching circuit into a second signal, and to output the second signal;

a first analog-to-digital converter configured to convert the second signal from analog to digital and to output the converted second signal;

a third selection filter comprising a third pass band narrower than the second pass band substantially at the center of the carrier configured to filter an output signal of the first analog-to-digital converter, and to output a filtered signal;

a delay circuit configured to delay an output signal of the third selection filter and to output a delayed signal;

a fourth selection filter comprising a fourth pass band narrower than the first pass band substantially at the center of the carrier configured to filter an input signal, and to output a filtered signal;

a second tuner configured to frequency-convert a signal from a second antenna into a third signal, to output the third signal to the fourth selection filter, to process a signal from the fourth selection filter into a fourth signal, and to output the fourth signal;

a second analog-to-digital converter configured to convert the fourth signal from analog to digital and to output a converted fourth signal;

a fifth selection filter comprising a same pass band as the third pass band configured to filter an output signal of the second analog-to-digital converter and to output a filtered signal;

a multipath equalizer configured to receive output signals of the delay circuit and the fifth selection filter, to execute multipath equalization, and to output an equalized signal; and a controlling circuit configured to control the first switching circuit and the delay circuit, wherein the controlling circuit is configured to cause the delay circuit to output the output signal of the third selection filter delayed by a first delay time, when the first switching circuit outputs the output signal of the first selection filter, and the controlling circuit is configured to cause the delay circuit to output the output signal of the third selection filter delayed by a second delay time, when the first switching circuit outputs the output signal of the second selection filter.

13. The receiving system of claim 12, wherein the delay circuit comprises:

a delay compensator configured to output the output signal of the third selection filter delayed by the first delay time; and a second switching circuit configured to switch a first output signal between the output signal of the third selection filter and the signal output from the delay compensator, and the controlling circuit is configured to cause the second switching circuit to switch the first output signal to the output signal of the delay compensator when the first switching circuit outputs the output signal of the first selection filter, and the controlling circuit is configured to cause the second switching circuit to switch the first output signal to the output signal of the third selection filter, when the first switching circuit outputs the output signal of the second selection filter.

14. The receiving system of claim 13, further comprising:

a decoder configured to decode a portion of a signal that has passed through the first pass band and attenuated in the second pass band from the first analog-to-digital converter;

a detector configured to detect the output signal of the multipath equalizer and to output a detected signal;

a stereo demodulator configured to separate an output signal of the detector into an L signal and an R signal and to output the L signal and the R signal; and an audio processor configured to process the L signal and the R signal from the stereo demodulator and to output an audio signal.

15. The receiving system of claim 12, further comprising:

a decoder configured to decode a portion of a signal that has passed through the first pass band and attenuated in the second pass band from the first analog-to-digital converter;

a detector configured to detect the output signal of the multipath equalizer and to output a detected signal;

a stereo demodulator configured to separate an output signal of the detector into an L signal and an R signal and to output the L signal and the R signal; and an audio processor configured to process the L signal and the R signal from the stereo demodulator and to output an audio signal.

16. The receiving system of claim 12, wherein the first delay time is based on a difference between a group delay time of the second selection filter and a group delay time of the first selection filter.

17. The receiving system of claim 12, wherein the second delay time is based on a difference between a group delay time of the second selection filter and a group delay time of the fourth selection filter.

18. The receiving system of claim 12, wherein the second delay time is zero.

19. The receiving system of claim 12, wherein the carrier is an FM signal.

20. The receiver of claim 10, wherein the carrier is an FM signal.

* * * * *